US009748866B2

United States Patent
Sawano

(10) Patent No.: US 9,748,866 B2
(45) Date of Patent: Aug. 29, 2017

(54) POWER CONVERSION APPARATUS AND CONTROL METHOD FOR POWER CONVERSION APPARATUS WHEN AN INSTANTANEOUS VOLTAGE DROP HAS OCCURRED IN A POWER SYSTEM

(71) Applicant: Panasonic Intellectual Property Management Co., Ltd., Osaka (JP)

(72) Inventor: Satoshi Sawano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/656,700

(22) Filed: Mar. 12, 2015

(65) Prior Publication Data
US 2015/0270788 A1 Sep. 24, 2015

(30) Foreign Application Priority Data
Mar. 20, 2014 (JP) ................ 2014-058990

(51) Int. Cl.
*H02M 7/5387* (2007.01)
*H02M 7/48* (2007.01)
(Continued)

(52) U.S. Cl.
CPC ......... *H02M 7/53871* (2013.01); *H02M 7/48* (2013.01); *H02J 3/381* (2013.01); *H02M 2001/0022* (2013.01)

(58) Field of Classification Search
CPC .. H02M 7/53871; H02M 7/062; H02M 7/125; H02M 7/4826; H02M 7/48;
(Continued)

(56) References Cited

U.S. PATENT DOCUMENTS

2008/0304195 A1* 12/2008 Lin .................. H02M 1/32
361/89
2009/0052209 A1* 2/2009 Kaitani ............ H02M 7/53875
363/37
(Continued)

FOREIGN PATENT DOCUMENTS

EP 2 328 262 6/2011
EP 2 680 425 1/2014
(Continued)

OTHER PUBLICATIONS

Extended European Search Report dated Aug. 4, 2015 in related European Patent Application No. 15158541.1.
Grid-interconnection Code, JEAC9701-2012, JESC E0019(2012).

*Primary Examiner* — Gustavo Rosario Benitez
(74) *Attorney, Agent, or Firm* — Wenderoth, Lind & Ponack, L.L.P.

(57) ABSTRACT

A power conversion apparatus includes a DC/DC converter which transforms DC power input from a dispersion type power source into DC power, a capacitor which holds the DC power supplied from the DC/DC converter, an inverter which converts the DC power held by the capacitor to AC power and outputs the AC power to a power system, and a controller which controls, when the power system recovers from an instantaneous voltage drop, the inverter to lower an AC current output from the inverter to be smaller than a value before occurrence of the instantaneous voltage drop by an amount increasing with an increase in the amount of voltage drop during the instantaneous voltage drop and to raise the AC current from the inverter after the lowering.

4 Claims, 13 Drawing Sheets

(51) Int. Cl.
*H02J 3/38* (2006.01)
*H02M 1/00* (2006.01)

(58) Field of Classification Search
CPC ........... H02M 2001/0022; H02M 1/32; H02M 7/515; H02M 7/5387; H02J 3/38; H02J 3/3813; H02J 3/381
See application file for complete search history.

(56) References Cited

U.S. PATENT DOCUMENTS

| | | | | |
|---|---|---|---|---|
| 2010/0008119 | A1* | 1/2010 | O'Brien | H01L 31/02021 363/132 |
| 2011/0101937 | A1* | 5/2011 | Dobkin | H02M 3/156 323/282 |
| 2011/0128760 | A1* | 6/2011 | Yuan | H02J 3/385 363/50 |
| 2012/0153726 | A1* | 6/2012 | Moon | H02J 3/32 307/46 |
| 2013/0027993 | A1* | 1/2013 | Tan | H02M 7/515 363/40 |
| 2013/0336025 | A1* | 12/2013 | Figueroa | H02J 3/386 363/37 |
| 2013/0336026 | A1* | 12/2013 | Figueroa | H02J 3/386 363/37 |

FOREIGN PATENT DOCUMENTS

| | | |
|---|---|---|
| EP | 2 680 426 | 1/2014 |
| JP | 2012-055036 | 3/2012 |
| JP | 2012-231606 | 11/2012 |

\* cited by examiner

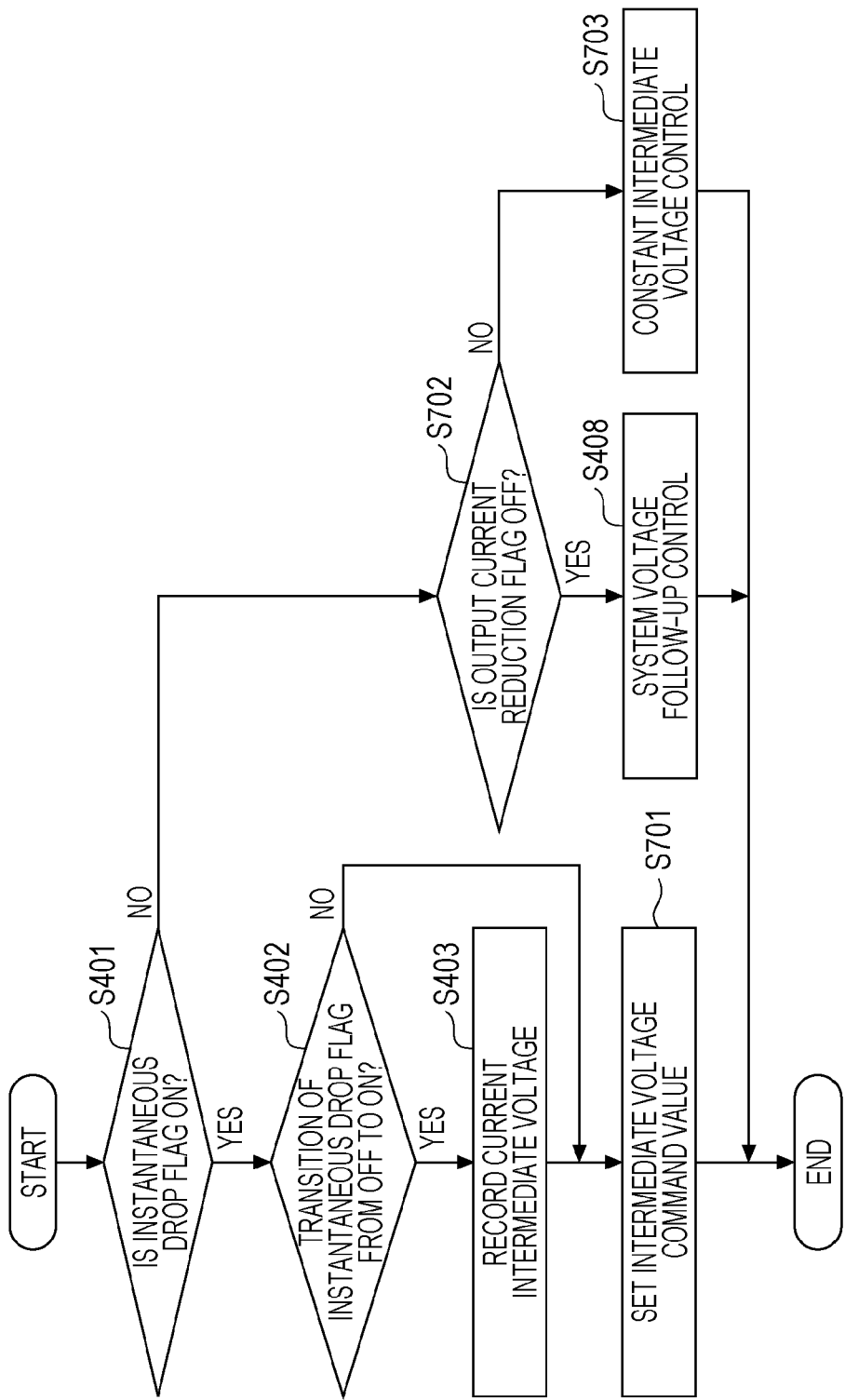

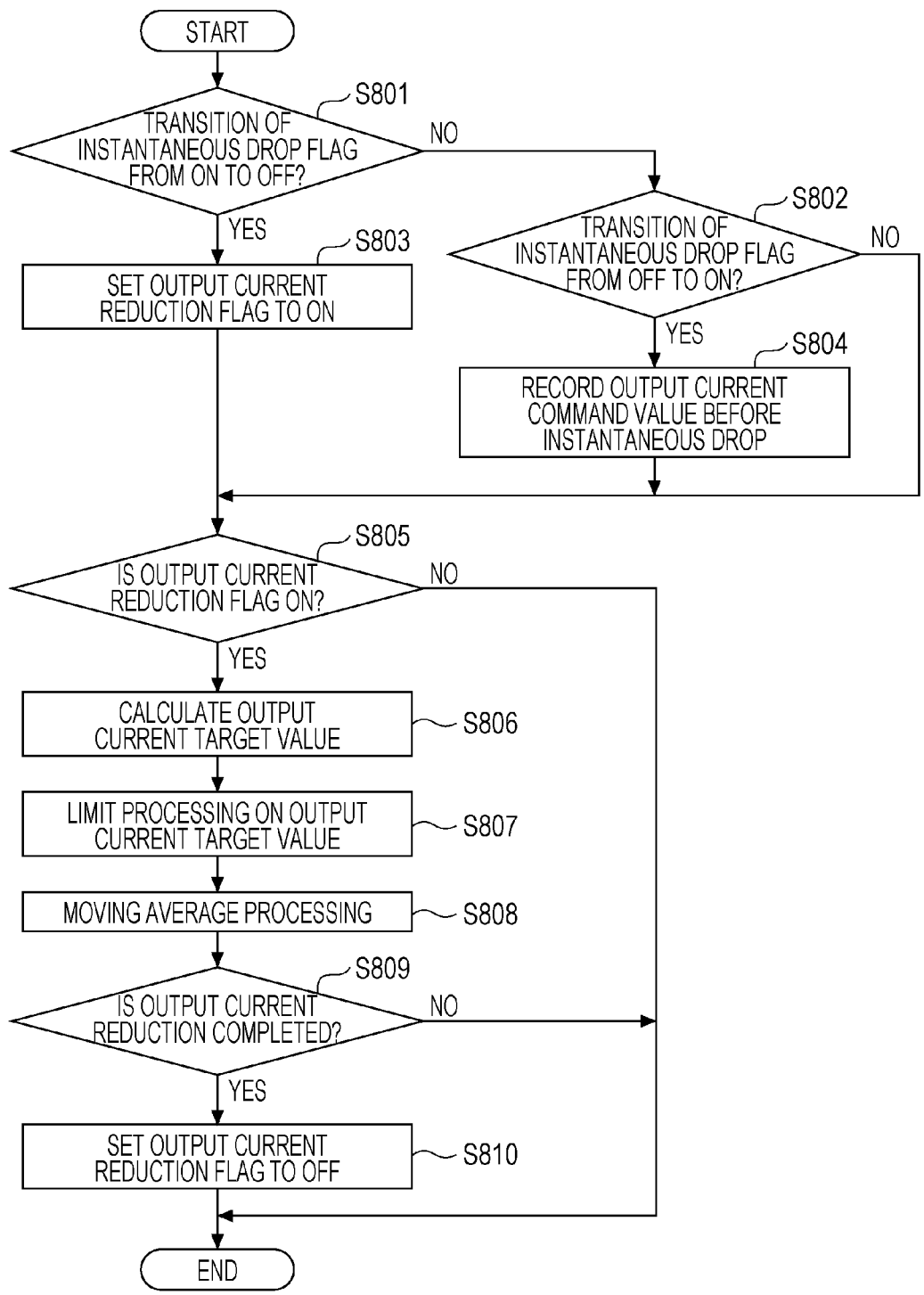

POWER CONVERSION APPARATUS AND CONTROL METHOD FOR POWER CONVERSION APPARATUS WHEN AN INSTANTANEOUS VOLTAGE DROP HAS OCCURRED IN A POWER SYSTEM

BACKGROUND

1. Technical Field

The present disclosure relates to a power conversion apparatus (power conditioner) and a control method for the power conversion apparatus when an instantaneous voltage drop has occurred in a power system.

2. Description of the Related Art

There has been available a dispersion type power source system including a dispersion type power source, such as a solar cell, and a power conversion apparatus which supplies power generated by the dispersion type power source to a power system.

The power conversion apparatus of the dispersion type power source system generally includes a DC/DC converter and an inverter. The DC/DC converter steps down or up DC power input from the dispersion type power source and supplies the DC power to an internal capacitor. The inverter converts power accumulated in the internal capacitor to AC power.

The dispersion type power source system is expected to continue operation as far as possible in the event of a disturbance, such as an instantaneous voltage drop (hereinafter referred to as an "instantaneous drop"), in a power system and to restore the level of output to a level before the disturbance, when recovering from the disturbance (see Grid-interconnection Code JEAC 9701-2012).

A method for operating a power conversion apparatus during an instantaneous drop is proposed in which an inverter is controlled to fix an output current to a value immediately before the instantaneous drop and a DC/DC converter is controlled such that a voltage of an internal capacitor has a target value set in advance (see, for example, Japanese Unexamined Patent Application Publication No. 2012-55036).

SUMMARY

The above-described technique according to the related art has room for improvement in recovery of a power system from an instantaneous drop.

One non-limiting and exemplary embodiment provides a power conversion apparatus which reduces deterioration in the quality of output power when a power system recovers from an instantaneous drop.

In one general aspect, the techniques disclosed here feature a power conversion apparatus including a DC/DC converter which transforms DC power input from a dispersion type power source into DC power, a capacitor which holds the DC power supplied from the DC/DC converter, an inverter which converts the DC power held by the capacitor to AC power and outputs the AC power to a power system, and a controller which controls, when the power system recovers from an instantaneous voltage drop, the inverter to lower an AC current output from the inverter to be smaller than a value before occurrence of the instantaneous voltage drop by an amount increasing with an increase in the amount of voltage drop during the instantaneous voltage drop and to raise the AC current from the inverter after the lowering.

A power conversion apparatus according to the present disclosure moderates fluctuations in output from an inverter when recovering from an instantaneous drop and reduces a drop in a voltage of an internal capacitor, as compared to the related art. This reduces deterioration in the power quality of output from the power conversion apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a flowchart of the operation of an intermediate voltage command value setting unit according to the second embodiment;

FIG. 8 is a flowchart of the operation of an output current command value setting unit according to the second embodiment;

DETAILED DESCRIPTION (Underlying Knowledge Forming Basis of the Present Disclosure)

When a power system recovers from an instantaneous drop, an output voltage of an inverter rises sharply together with a system voltage. For this reason, output power from the conventional inverter, which performs control such that an output current is steady, rises sharply. As a result, power which the inverter discharges to the power system exceeds power which a DC/DC converter supplies to an internal capacitor, which reduces the voltage of the internal capacitor.

The reduction in the voltage of the internal capacitor is likely to generate higher harmonics in the output current from the inverter and may impair the power quality of output from a power conversion apparatus.

Additionally, the amount of voltage drop in the power system during an instantaneous drop and the amount of voltage rise in the power system when recovering from the instantaneous drop are almost equal to each other. Thus, the amount of voltage drop in the voltage of the internal capacitor when recovering from an instantaneous drop depends on the amount of voltage drop in the power system during the instantaneous drop.

The amount of voltage drop in the power system during an instantaneous drop is not fixed. For this reason, a conventional method that performs control such that the voltage of the internal capacitor has a target value set in advance, regardless of the amount of voltage drop, may cause, for example, the problems below. If the amount of voltage drop is large with respect to the target value for the voltage of the internal capacitor set in advance, the voltage of the internal capacitor is likely to decrease to generate a harmonic current when recovering from an instantaneous drop (a first problem).

On the other hand, if the amount of voltage drop is small with respect to the target value for the voltage of the internal capacitor set in advance, the voltage of the internal capacitor is higher than necessary, and power conversion efficiency during an instantaneous drop period is lower (a second problem).

The present inventor has focused on the fact that the amount of voltage drop in the voltage of the internal capacitor upon recovery from an instantaneous drop depends on the amount of voltage drop in the power system during the instantaneous drop and has reached the embodiments illustrated below.

Embodiments of the present disclosure will be described below with reference to the drawings.

First Embodiment

<Configuration of Power Conditioner 100>

Figure 1:
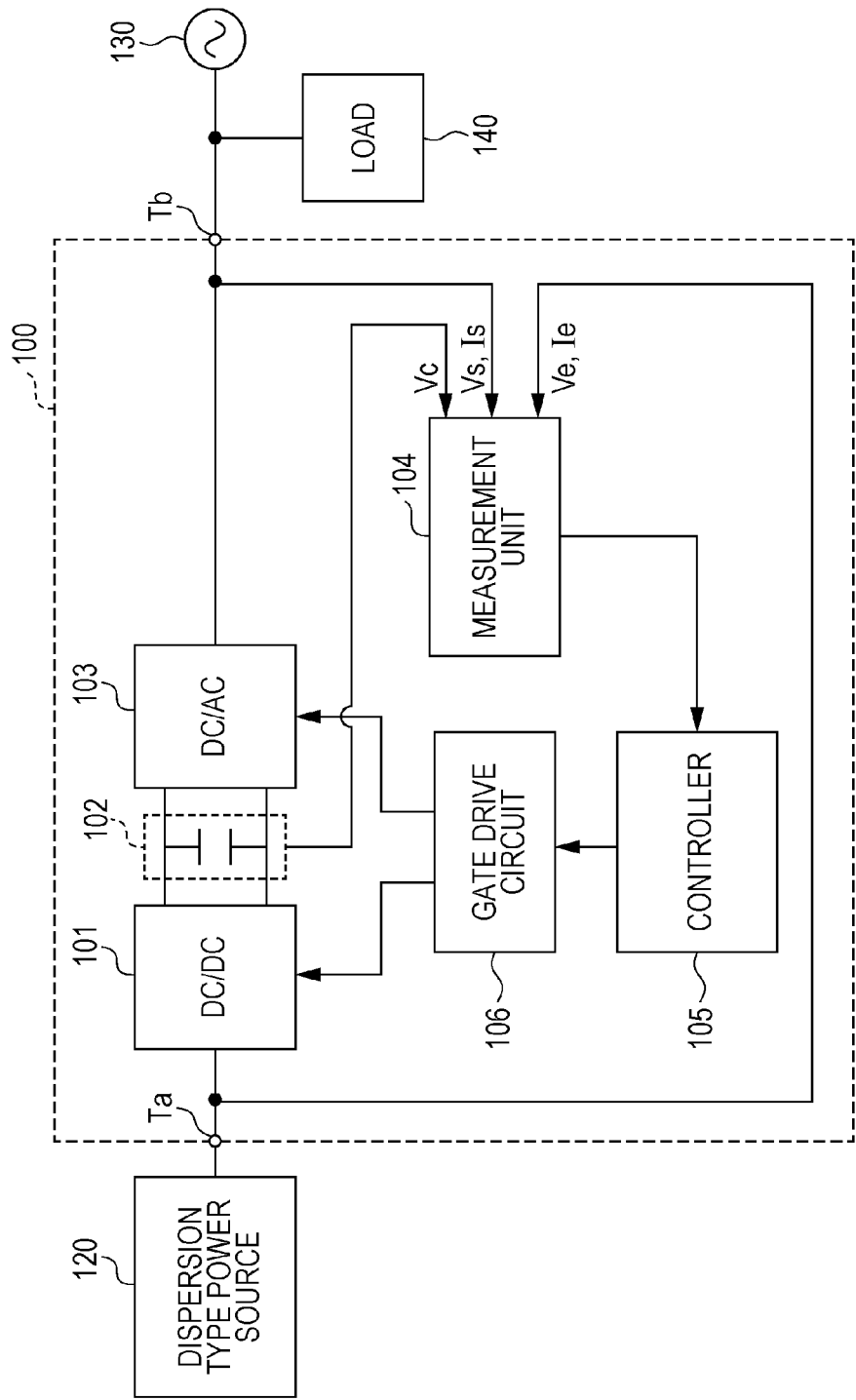
FIG. 1 is a diagram illustrating an example of the configuration of a power conditioner according to a first embodiment.

FIG. 1 is a diagram illustrating the configuration of a power conditioner 100 according to a first embodiment.

The power conditioner 100 has a terminal Ta and a terminal Tb. The power conditioner 100 is used while the terminal Ta is connected to a dispersion type power source 120 as a DC power source, and the power conditioner 100 is interconnected to a power system 130 via the terminal Tb. The power conditioner 100 supplies power to a load 140 which is connected between the power conditioner 100 and the power system 130.

Note that the dispersion type power source 120 is a DC power source which is composed of a solar cell, a fuel cell, or a secondary battery, such as a lithium ion battery.

The power conditioner 100 includes a DC/DC converter 101, a capacitor 102, an inverter (DC/AC converter) 103, a measurement unit 104, a controller 105, and a gate drive circuit 106.

The DC/DC converter 101 steps up or down DC power input from the dispersion type power source 120 and supplies the DC power to the capacitor 102. The DC/DC converter 101 includes a switching element, such as a transistor, a DC reactor, and a diode for backflow prevention. Note that a protective diode may be connected in anti-parallel to each switching element. The switching element is driven in accordance with a gate signal Sg1 input from the gate drive circuit 106, thereby converting the input voltage from the dispersion type power source 120 to a desired voltage.

The capacitor 102 accumulates power supplied from the DC/DC converter 101, smooths the power, and outputs the power to the inverter 103.

The inverter 103 converts DC power from the capacitor 102 to AC power and outputs the AC power toward the terminal Tb. The inverter 103 is composed of, for example, bridged switching elements, such as a transistor. Note that a protective diode may be connected in anti-parallel to each switching element. The switching element is driven in accordance with a gate signal Sg2 input from the gate drive circuit 106, thereby converting the DC power from the capacitor 102 to AC power.

The measurement unit 104 acquires a voltage value Ve and a current value Ie of the dispersion type power source 120 (the input side of the DC/DC converter 101), a value of a voltage (hereinafter referred to as an intermediate voltage) Vc of the capacitor 102, and values of a voltage Vs and a current Is of the power system 130 (the output side of the inverter 103) and outputs analog signals having amplitude values corresponding to the values to the controller 105.

The controller 105 generates PWM signals (Sg1' and Sg2') for controlling ON/OFF statuses of the switching elements of the DC/DC converter 101 and the inverter 103, using the voltage value Ve and the current value Ie of the dispersion type power source 120, the value of the voltage Vc, and the values of the voltage Vs and the current Is of the power system 130 (the output side of the inverter 103) that are input from the measurement unit 104.

The gate drive circuit 106 transmits the PWM signals (Sg1' and Sg2') generated by the controller 105 as gate signals (Sg1 and Sg2) for driving the switching elements to the DC/DC converter 101 and the inverter 103 while providing electrical isolation using, for example, a photocoupler.

<Configuration of Controller 105>

Figure 2:
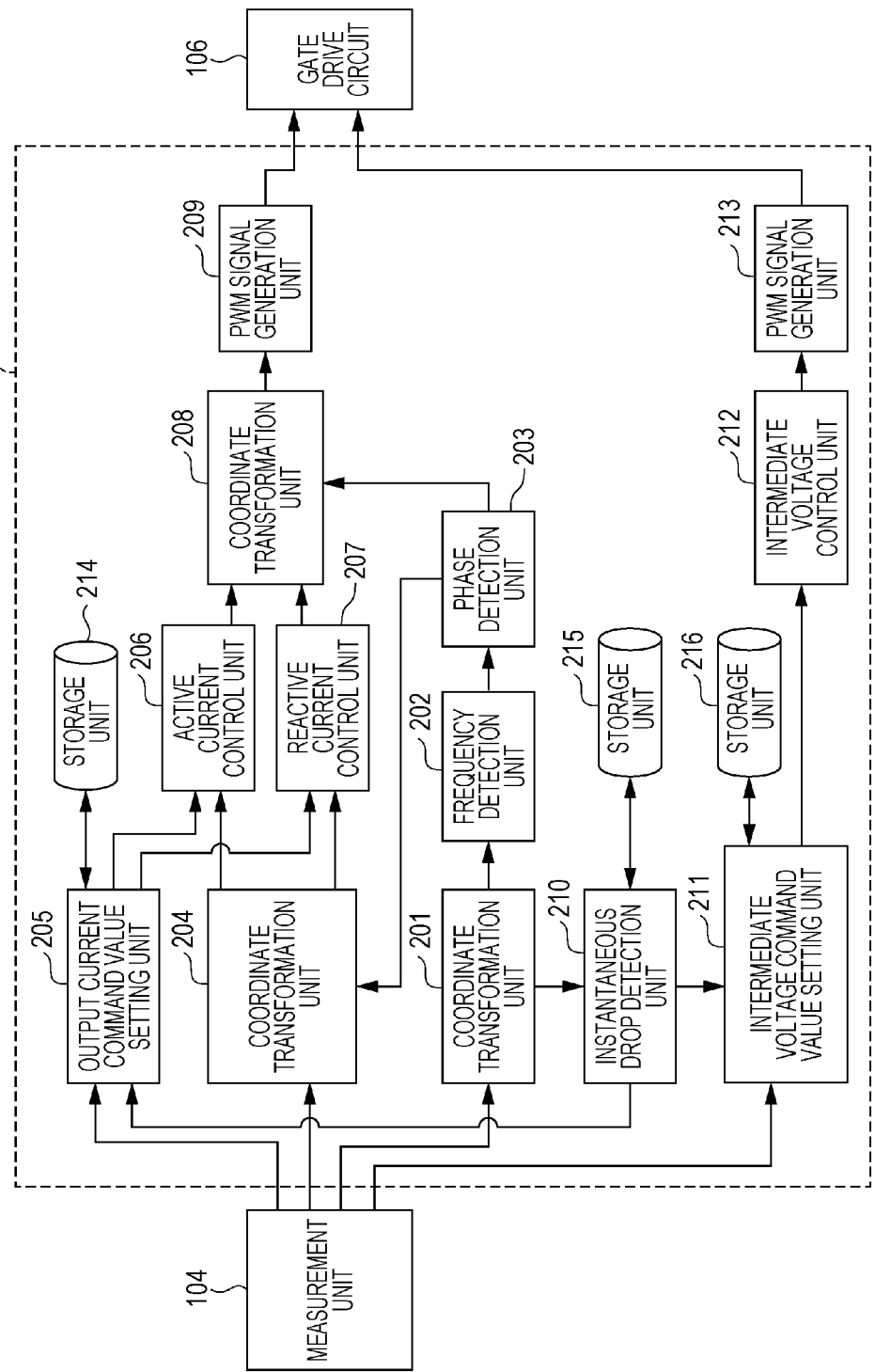
FIG. 2 is a block diagram illustrating an example of the configuration of a controller according to the first embodiment.

FIG. 2 is a block diagram illustrating an example of the configuration of the controller 105 in FIG. 1.

The controller 105 includes coordinate transformation units 201, 204, and 208, a frequency detection unit 202, a phase detection unit 203, an output current command value setting unit 205, an active current control unit 206, a reactive current control unit 207, PWM signal generation units 209 and 213, an instantaneous drop detection unit 210, an intermediate voltage command value setting unit 211, an intermediate voltage control unit 212, and storage units 214, 215, and 216.

Analog signals input from the measurement unit 104 are AD-converted at a predetermined sampling frequency (for example, 17.5 kHz) by an AD conversion circuit incorporated in the controller 105, and resultant signals are fed to the functional units.

The coordinate transformation unit 201 transforms the value of the voltage (system voltage) Vs of the power system 130 to two components in an orthogonal coordinate system (direct-quadrature coordinate system) at a rotation speed corresponding to a fundamental frequency (for example, 50

Hz) of the value and outputs a d-axis component Vd and a q-axis component Vq of the value of the system voltage Vs to the downstream side (the frequency detection unit 202 and the instantaneous drop detection unit 210). The coordinate transformation unit 201 outputs the d-axis and q-axis components Vd and Vq, for example, in each cycle of AD conversion in the controller 105.

The frequency detection unit 202 detects (calculates) a system voltage frequency fv on the basis of the d-axis component Vd and the q-axis component Vq of the value of the system voltage Vs and outputs a detection result to the downstream side (the phase detection unit 203). The frequency detection unit 202 detects the system voltage frequency fv, for example, in each cycle of AD conversion in the controller 105.

The phase detection unit 203 detects (calculates) a system voltage phase θs on the basis of the system voltage frequency fv and outputs a detection result to the downstream side (the coordinate transformation unit 204 and the coordinate transformation unit 208). The phase detection unit 203 detects the system voltage phase θs, for example, in each cycle of AD conversion in the controller 105.

The coordinate transformation unit 204 calculates an active current detection value Ip which is an active component of the value of the current Is of the power system 130 and a reactive current detection value Iq which is a reactive component, using the value of the current Is of the power system 130 and the system voltage phase θs. The coordinate transformation unit 204 outputs the active current detection value Ip to the active current control unit 206 and the reactive current detection value Iq to the reactive current control unit 207. The coordinate transformation unit 204 calculates the active current detection value Ip and the reactive current detection value Iq, for example, in each cycle of AD conversion in the controller 105.

The output current command value setting unit 205 sets an active current command value Ip* which is a command value for an active current as output from the inverter 103 and a reactive current command value Iq* which is a command value for a reactive current and outputs the active current command value Ip* to the active current control unit 206 and the reactive current command value Iq* to the reactive current control unit 207. The output current command value setting unit 205 sets the active current command value Ip* and the reactive current command value Iq*, for example, in each cycle of AD conversion in the controller 105.

The output current command value setting unit 205 acts differently in normal times (when an instantaneous drop detection signal flag1 which is input from the instantaneous drop detection unit 210 is OFF) and during an instantaneous drop (when the instantaneous drop detection signal flag1 that is input from the instantaneous drop detection unit 210 is ON).

In normal times, the output current command value setting unit 205 sets the active current command value Ip* for maintaining the intermediate voltage Vc at a value slightly higher than an effective value of the system voltage Vs. The output current command value setting unit 205 also monitors the instantaneous drop detection signal flag1 input from the instantaneous drop detection unit 210. When the output current command value setting unit 205 detects a transition from OFF to ON of the instantaneous drop detection signal flag1, the output current command value setting unit 205 records the active current command value Ip* that is determined immediately before the detection in the storage unit 214. During an instantaneous drop, the output current command value setting unit 205 sets a value recorded in the storage unit 214 as the active current command value Ip*.

Note that, in the first embodiment, the reactive current command value Iq* is set to 0 in order to set a power factor of output from the inverter 103 to 1.

The active current control unit 206 generates, as an active voltage command value Vp*, a correction signal for an active voltage of the output from the inverter 103 for bringing the difference between the active current detection value Ip and the active current command value Ip* close to zero and outputs the active voltage command value Vp* to the coordinate transformation unit 208. The active current control unit 206 outputs the active voltage command value Vp*, for example, in each cycle of AD conversion in the controller 105.

The reactive current control unit 207 generates, as a reactive voltage command value Vq*, a correction signal for a reactive voltage of the output from the inverter 103 for bringing the difference between the reactive current detection value Iq and the reactive current command value Iq* close to zero and outputs the reactive voltage command value Vq* to the coordinate transformation unit 208. The reactive current control unit 207 outputs the reactive voltage command value Vq*, for example, in each cycle of AD conversion in the controller 105.

The coordinate transformation unit 208 calculates an AC voltage command value Vs2* on the basis of the system voltage phase θs, and the active voltage command value Vp* and the reactive voltage command value Vq*. The coordinate transformation unit 208 outputs the calculated AC voltage command value Vs2* to the PWM signal generation unit 209. The coordinate transformation unit 208 calculates the AC voltage command value Vs2*, for example, in each cycle of AD conversion in the controller 105.

The PWM signal generation unit 209 generates, as the PWM signal Sg2', a pulse signal with a duty ratio corresponding to the AC voltage command value Vs2* and outputs the PWM signal Sg2' to the gate drive circuit 106. As described above, the gate drive circuit 106 outputs the gate signal Sg2 to the inverter 103 on the basis of the PWM signal Sg2' output from the controller 105 (the PWM signal generation unit 209). In the above-described manner, the controller 105 controls the inverter 103 such that output currents coincide with command values (the active current command value Ip* and the reactive current command value Iq*).

The instantaneous drop detection unit 210 detects (calculates) an effective value (amplitude value) of the system voltage Vs from the d-axis component Vd and the q-axis component Vq of the system voltage Vs input from the coordinate transformation unit 201 and records the effective value in the storage unit 215 in each cycle of AD conversion in the controller 105. The instantaneous drop detection unit 210 senses occurrence of an instantaneous drop and recovery from the instantaneous drop by comparing a current system voltage effective value with a system voltage effective value of a predetermined time before and detects the amount of voltage drop during the instantaneous drop. The instantaneous drop detection unit 210 outputs the instantaneous drop detection signal flag1 and the amount of voltage drop to the output current command value setting unit 205 and the intermediate voltage command value setting unit 211. The instantaneous drop detection signal flag1 is ON while an instantaneous drop persists and is OFF at other times (before occurrence of the instantaneous drop and after recovery from the instantaneous drop). A method for sensing occurrence of an instantaneous drop and recovery from the instantaneous drop in the instantaneous drop detection unit 210 and a method for detecting the amount of voltage drop will be described later.

The intermediate voltage command value setting unit 211 determines an intermediate voltage command value Vc* which is a command value for the intermediate voltage Vc on the basis of the instantaneous drop detection signal flag1 and the amount of voltage drop input from the instantaneous drop detection unit 210, the value of the intermediate voltage Vc input from the measurement unit 104, and the voltage value Ve and the current value Ie of the dispersion type power source 120. The intermediate voltage command value setting unit 211 determines the intermediate voltage command value Vc* in each cycle of AD conversion in the controller 105. The details of the operation of the intermediate voltage command value setting unit 211 will be described later.

The intermediate voltage control unit 212 generates, as a control manipulated variable Vs1*, a correction signal for bringing the difference between the intermediate voltage command value Vc* and the value of the intermediate voltage Vc close to zero on the basis of the current value Ie and the voltage value Ve of the dispersion type power source 120, and the value of the intermediate voltage Vc input from the measurement unit 104 (via the intermediate voltage command value setting unit 211) and outputs the control manipulated variable Vs1* to the PWM signal generation unit 213. The intermediate voltage control unit 212 outputs the control manipulated variable Vs1* in each cycle of AD conversion in the controller 105.

The PWM signal generation unit 213 generates, as the PWM signal Sg1', a pulse signal with a duty ratio corresponding to the control manipulated variable Vs1* and outputs the PWM signal Sg1' to the gate drive circuit 106. As described above, the gate drive circuit 106 outputs the gate signal Sg1 to the DC/DC converter 101 on the basis of the PWM signal Sg1' output from the controller 105 (the PWM signal generation unit 213). In the above-described manner, the controller 105 controls the DC/DC converter 101 such that an output voltage coincides with a command value (the intermediate voltage command value Vc*).

The configuration of the power conditioner 100 according to the first embodiment has been described above. The operation of the power conditioner 100 according to the first embodiment will be described.

<Operation of Instantaneous Drop Detection Unit 210>

Figure 3:
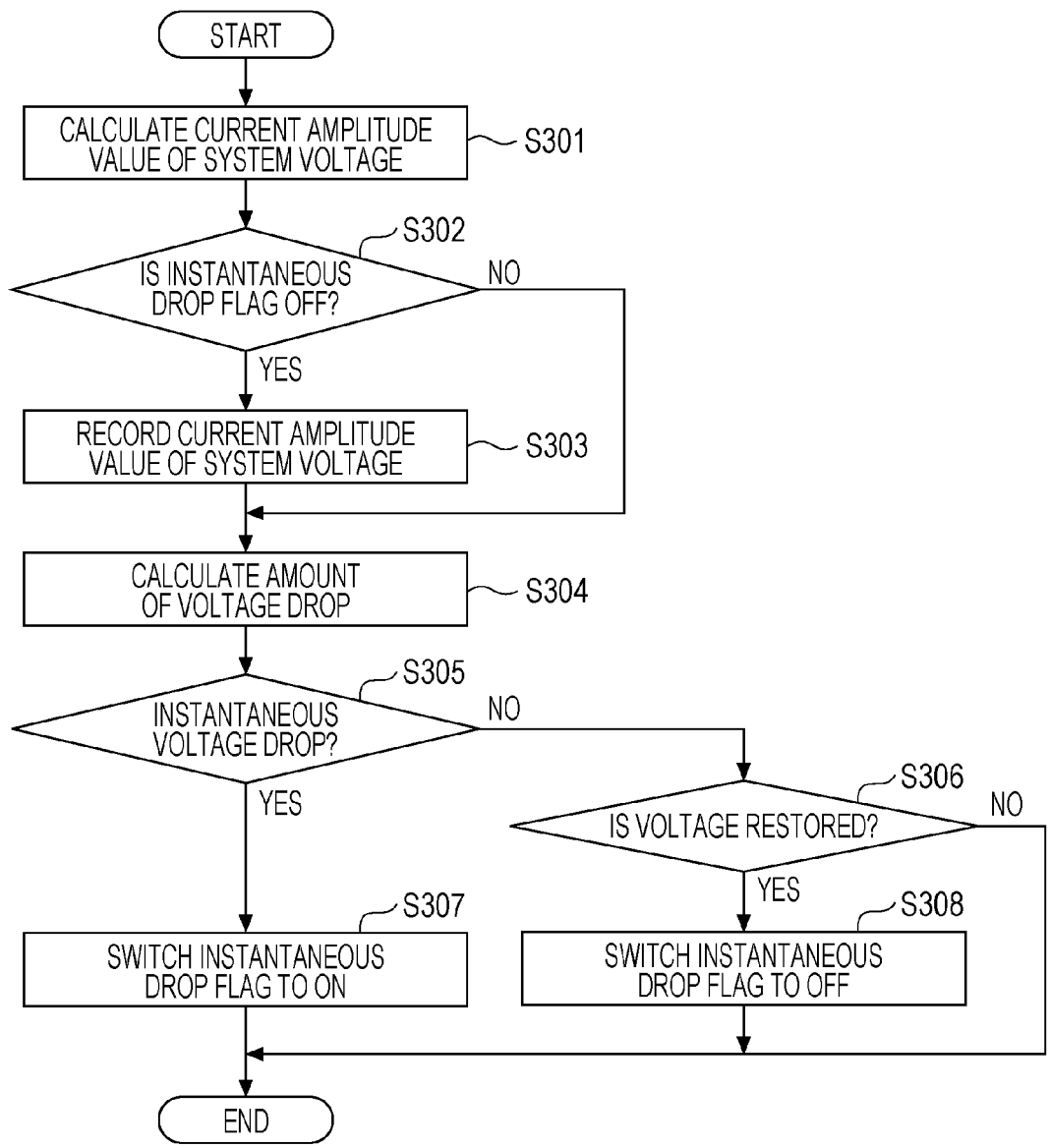
FIG. 3 is a flowchart of the operation of an instantaneous drop detection unit according to the first embodiment.

FIG. 3 is a flowchart illustrating the operations of a method for sensing occurrence of an instantaneous drop and recovery from the instantaneous drop in the instantaneous drop detection unit 210 and a method for detecting an amount ΔV of voltage drop.

Step S301 is a step of detecting (calculating) a current effective value Vnow of the system voltage Vs from signals as the d-axis component Vd and the q-axis component Vq of the system voltage Vs in each cycle of AD conversion in the controller 105. Note that an effective value of the system voltage Vs is about 250 V in normal times here but is not limited to this.

Step S302 is a step of judging whether the instantaneous drop detection signal flag1 is OFF. If the instantaneous drop detection signal flag1 is OFF, the flow advances to step S303. On the other hand, if the instantaneous drop detection signal flag1 is ON, the flow advances to step S304.

Step S303 is a step of sequentially recording the current voltage effective value Vnow detected in step S301 in the storage unit 215 and acquiring a voltage effective value Vpast of a predetermined time before now (for example, in a previous cycle of AD conversion in the controller 105) from the storage unit 215. Since the process in step S303 is a process only when the instantaneous drop detection signal flag1 is OFF (a process in normal times), the voltage effective value Vpast during an instantaneous drop is a voltage effective value obtained when the power system 130 is normal before occurrence of the instantaneous drop.

Step S304 is a step of calculating the amount ΔV of voltage drop as the difference between the voltage effective value Vnow and the voltage effective value Vpast, as shown in Expression (1) below:

$$\Delta V = V\text{past} - V\text{now} \tag{1}$$

Note that the amount ΔV of voltage drop is almost zero in normal times.

Step S305 is a step of detecting whether an instantaneous drop has occurred. More specifically, step S305 judges whether the amount ΔV of voltage drop and the voltage effective value Vpast satisfy Expression (2) below.

$$\Delta V > V\text{past} \times A1 \tag{2}$$

In Expression (2), A1 is a constant defined in advance. For example, if A1=0.20, when the amount ΔV of voltage drop exceeds 20% of the voltage effective value Vpast in normal times (the voltage effective value Vnow falls below 80% of the voltage effective value Vpast), it is detected that an instantaneous drop has occurred.

If occurrence of an instantaneous drop is detected in step S305, the flow advances to step S307 to switch the instantaneous drop detection signal flag1 to ON. On the other hand, if an instantaneous drop is not detected, the flow advances to step S306.

Step S306 is a step of detecting whether the power system 130 has recovered from an instantaneous drop. More specifically, step S306 judges whether the voltage effective value Vnow and the voltage effective value Vpast satisfy Expression (3) below.

$$V\text{now} > V\text{past} \times A2 \tag{3}$$

In Expression (3), A2 is a set value set in advance. For example, if A2=0.90, when the voltage effective value Vnow exceeds 90% of the voltage effective value Vpast before occurrence of an instantaneous drop, it is detected that the power system 130 has recovered from the instantaneous drop.

If recovery from an instantaneous drop is detected in step S306, the flow advances to step S308 to switch the instantaneous drop detection signal flag1 to OFF. On the other hand, if recovery from an instantaneous drop is not detected, the flow advances to END (switching of the instantaneous drop detection signal flag1 is not performed in this case, and the instantaneous drop detection signal flag1 before the start of the process is maintained).

The instantaneous drop detection unit 210 senses occurrence of an instantaneous drop and recovery from the instantaneous drop and detects the amount ΔV of voltage drop, through the operation illustrated in FIG. 3.

<Operation of Intermediate Voltage Command Value Setting Unit 211>

Figure 4:
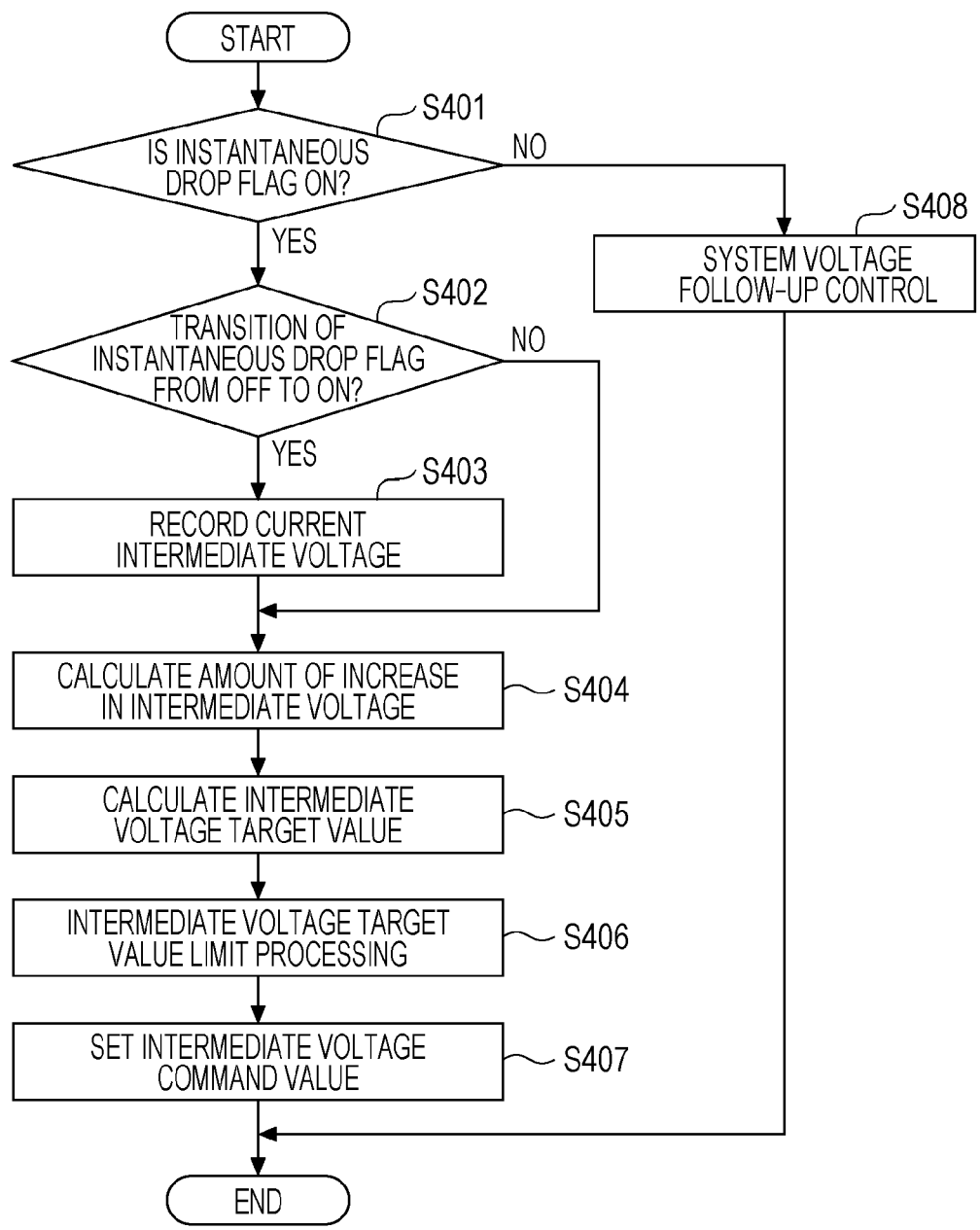
FIG. 4 is a flowchart of the operation of an intermediate voltage command value setting unit according to the first embodiment.

FIG. 4 is a flowchart illustrating the operation of the intermediate voltage command value setting unit 211. The intermediate voltage command value setting unit 211 performs system voltage follow-up control in normal times that determines the intermediate voltage command value Vc* on the basis of a system voltage effective value and constant intermediate voltage control during an instantaneous drop that determines the intermediate voltage command value Vc* on the basis of the amount ΔV of voltage drop.

Step S401 is a step of performing conditional branch processing based on the instantaneous drop detection signal flag1 input to the intermediate voltage command value setting unit 211. During an instantaneous drop (if the instantaneous drop detection signal flag1 is ON), the flow advances to step S402. In normal times (if the instantaneous drop detection signal flag1 is OFF), the flow advances to step S408.

Step S408 is a step of performing the system voltage follow-up control, that is, a step of setting the intermediate voltage command value Vc* in normal times. The intermediate voltage command value setting unit 211 sets the intermediate voltage command value Vc* in normal times such that the intermediate voltage command value Vc* is slightly higher than an effective value Vs' of the system voltage Vs, as shown in Expression (4) below, thereby maintaining an output current from the inverter 103 sinusoidal.

$$Vc^* = Vs' + K1 \quad (4)$$

In Expression (4), K1 (for example, a value 10% of a system voltage effective value in normal times, which is set to 25 here) is a constant defined in advance. The constant K1 is set in normal times such that the intermediate voltage command value Vc* is higher by K1 (V) than the fluctuating system voltage Vs (Vs').

Step S402 is a step of detecting a moment of occurrence of an instantaneous drop by sensing a transition from OFF to ON of the instantaneous drop detection signal flag1. For example, the instantaneous drop detection signal flag1 is sequentially recorded in the storage unit 216, and the moment is detected by comparing the current instantaneous drop detection signal flag1 with the previous instantaneous drop detection signal flag1 (for example, in a previous cycle of AD conversion in the controller 105) recorded in the storage unit 216. If a transition from OFF to ON of the instantaneous drop detection signal flag1 is detected, the flow advances to step S403; otherwise, the flow advances to step S404.

Step S403 is a step of recording a current value Vcnow of the value of the intermediate voltage Vc input from the measurement unit 104 in the storage unit 216. With the judgment in step S402, the intermediate voltage value Vcnow to be recorded in the storage unit 216 is an intermediate voltage value at a moment of occurrence of an instantaneous drop.

Step S404 is a step of calculating an amount α of increase in intermediate voltage on the basis of the amount ΔV of voltage drop caused by an instantaneous drop according to Expression (5) below.

$$\alpha = \Delta V \times K2 \quad (5)$$

In Expression (5), K2 (for example, 0.2) is a constant defined in advance. The amount α of increase in intermediate voltage increases in proportion to the amount ΔV of voltage drop.

Step S405 is a step of calculating an intermediate voltage control target value Vc*' from the intermediate voltage value Vcnow recorded in the storage unit 216 in step S403 and the amount α of increase in intermediate voltage calculated in step S404, as shown in Expression (6) below.

$$Vc^{*\prime} = Vcnow + \alpha \quad (6)$$

Step S406 is a step of setting an upper limit on the intermediate voltage control target value Vc*' calculated in step S405 and is a step for inhibiting the control target value Vc*' from becoming too large.

Step S407 sets the intermediate voltage command value Vc* to the control target value Vc*' subjected to the limit processing in step S406 and outputs the intermediate voltage command value Vc* to the intermediate voltage control unit 212.

The intermediate voltage command value setting unit 211 sets the intermediate voltage command value Vc* through the operation illustrated in FIG. 4.

<Conclusion of First Embodiment>

Figure 5A:
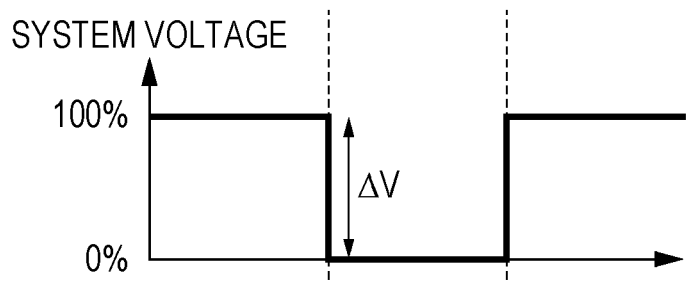
FIGS. 5A to 5D are charts illustrating an effective value of a system voltage, an effective value of an output current from an inverter, an effective value of output from the inverter, and an intermediate voltage upon occurrence of an instantaneous drop and upon recovery from the instantaneous drop, according to the first embodiment.
Figure 5B:
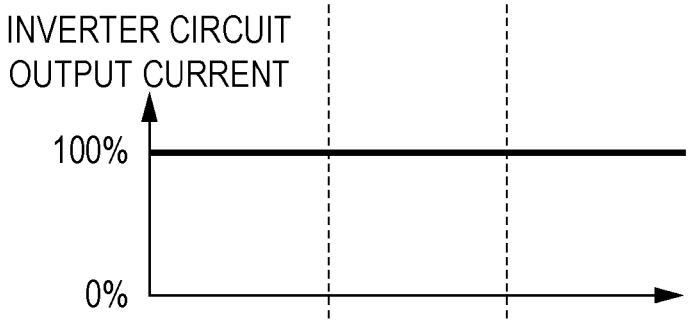
Figure 5C:
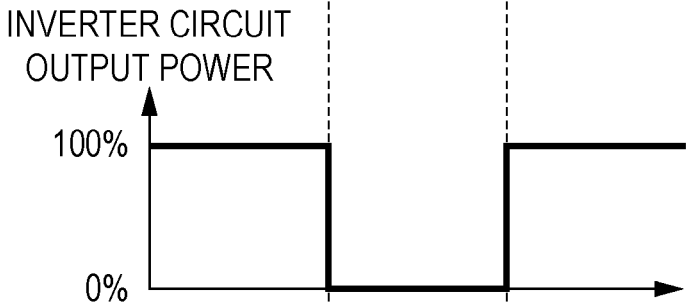
Figure 5D:
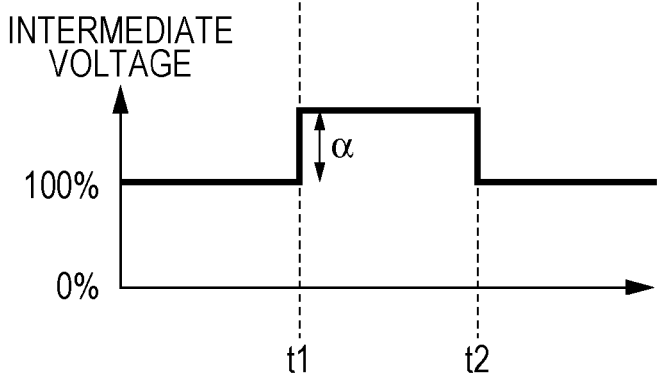

FIGS. 5A to 5D are charts illustrating an effective value of the system voltage Vs, an effective value of the output current Is from the inverter 103, an effective value of the output from the inverter 103, and the intermediate voltage Vc upon occurrence of an instantaneous drop and upon recovery from the instantaneous drop. FIG. 5A illustrates the effective value of the system voltage Vs, FIG. 5B illustrates the effective value of the output current Is from the inverter 103, FIG. 5C illustrates the effective value of the output from the inverter 103, and FIG. 5D illustrates the intermediate voltage Vc. In FIGS. 5A to 5D, the abscissa represents time, reference character t1 denotes a time of occurrence of an instantaneous drop, and reference character t2 denotes a time of recovery from the instantaneous drop.

The controller 105 according to the first embodiment controls the power conditioner 100 such that the intermediate voltage Vc becomes higher by a corresponding to the amount ΔV of voltage drop upon occurrence of an instantaneous drop than in normal times, as illustrated in FIG. 5D.

The amount of drop in system voltage upon occurrence of an instantaneous drop and the amount of rise in system voltage upon recovery from the instantaneous drop are equal. Since if control is performed such that the output current is steady, the amount of fluctuation in output power can be calculated from the amount of fluctuation in voltage at the time t1 of occurrence of the instantaneous drop, the amount of drop in intermediate voltage at the time t2 of recovery can be estimated in advance upon the occurrence of the instantaneous drop. For this reason, the intermediate voltage is made higher on the basis of the amount of voltage drop during the instantaneous drop in expectation of a drop in the intermediate voltage at the time t2 of recovery from the instantaneous drop, thereby allowing the capacitor 102 to maintain the intermediate voltage needed to maintain the output current sinusoidal. Thus, the power conditioner 100 according to the first embodiment reduces generation of output current even when recovering from an instantaneous drop and reduces deterioration in the power quality of output.

Second Embodiment

<Summary of Second Embodiment>

The first embodiment has described a method for maintaining an intermediate voltage value needed to maintain an output current sinusoidal when recovering from an instantaneous drop by considering in advance a drop in intermediate voltage when recovering from an instantaneous drop.

A second embodiment will describe a configuration which maintains an intermediate voltage value needed to maintain an output current from an inverter sinusoidal when recovering from an instantaneous drop by controlling the output current from the inverter upon the recovery.

The second embodiment is different from the first embodiment in that an intermediate voltage Vc is not increased on the basis of an amount ΔV of voltage drop but is controlled so as to be steady during an instantaneous drop and that an output current Is from an inverter 103 is reduced on the basis of the amount ΔV of voltage drop when recovering from the instantaneous drop.

<Configuration of Controller 600 According to Second Embodiment>

Figure 6:
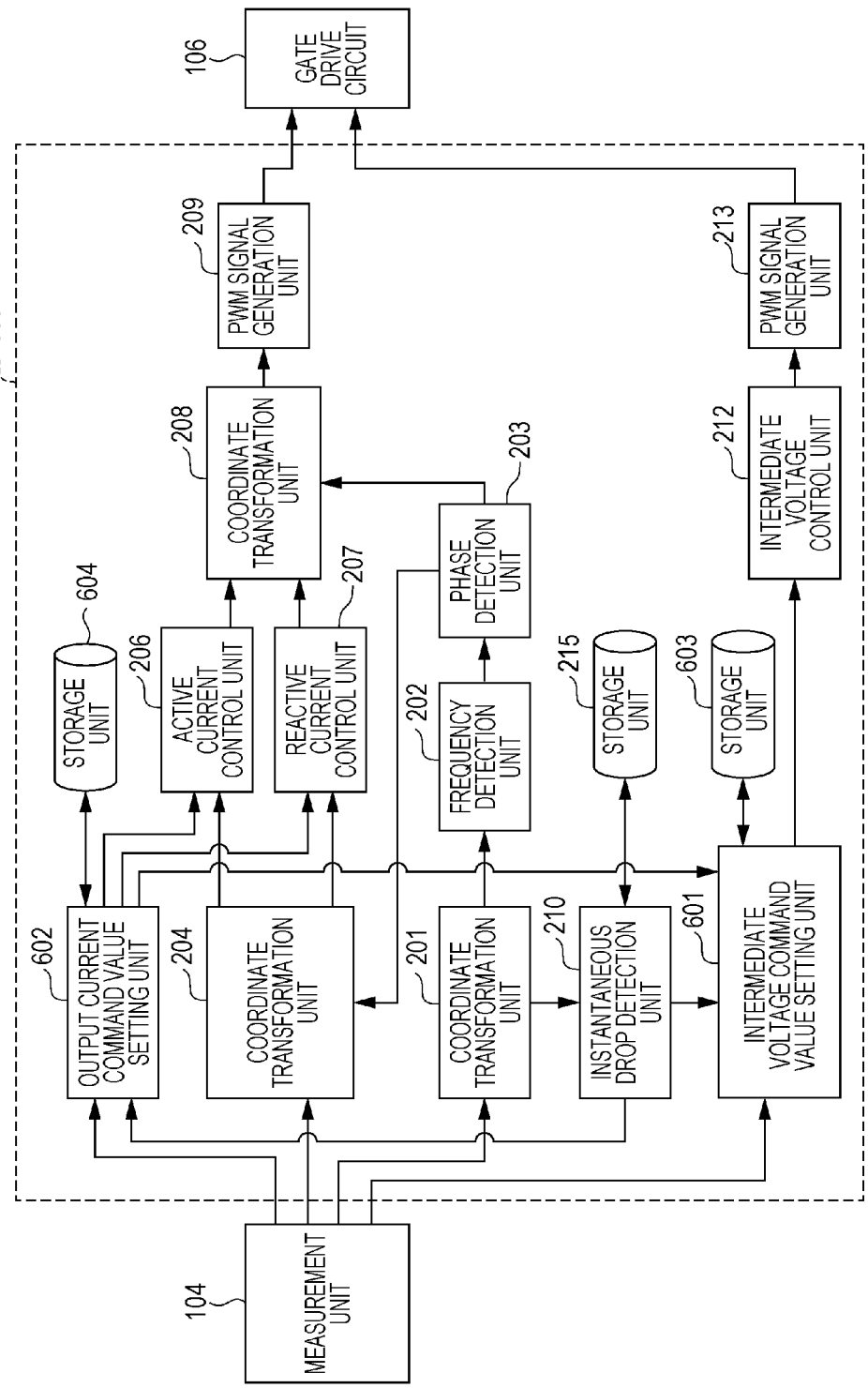
FIG. 6 is a block diagram illustrating an example of the configuration of a controller according to a second embodiment.

FIG. 6 is a diagram illustrating the configuration of a controller 600 according to the second embodiment.

The controller 600 according to the second embodiment includes an intermediate voltage command value setting unit 601, an output current command value setting unit 602, and storage units 603 and 604, instead of the intermediate voltage command value setting unit 211, the output current command value setting unit 205, and the storage units 216 and 214 in the controller 105 according to the first embodiment.

The same components as those in the first embodiment are denoted by the same reference numerals, and a description thereof will be omitted.

The intermediate voltage command value setting unit 601 performs system voltage follow-up control and constant intermediate voltage control on the basis of an instantaneous drop detection signal flag1 input from an instantaneous drop detection unit 210 to set an intermediate voltage command value Vc* and outputs the intermediate voltage command value Vc* to an intermediate voltage control unit 212. The details of the operation of the intermediate voltage command value setting unit 601 will be described later.

The output current command value setting unit 602 is different from the output current command value setting unit 205 according to the first embodiment in that an active current command value Ip* is set on the basis of the amount ΔV of voltage drop when recovering from an instantaneous drop and then swept (restored) to a value before occurrence of the instantaneous drop. The details of the operation of the output current command value setting unit 602 will be described later.

<Operation of Intermediate Voltage Command Value Setting Unit 601>

FIG. 7 is a flowchart illustrating the operation of the intermediate voltage command value setting unit 601. The same operations as those of the intermediate voltage command value setting unit 211 according to the first embodiment are denoted by the same step numbers, and a description thereof will be omitted.

The second embodiment is different from the first embodiment in that the intermediate voltage command value Vc* is set so as to maintain an intermediate voltage upon detection of an instantaneous drop regardless of the amount ΔV of voltage drop, during the instantaneous drop.

Step S701 is a step of setting, as the intermediate voltage command value Vc*, an intermediate voltage value Vcnow stored in the storage unit 603 (corresponding to the storage unit 216 according to the first embodiment) in step S403, as shown in Expression (7):

$$Vc^* = Vc\text{now} \tag{7}$$

Step S702 is a step of performing conditional branch processing on the basis of an output current reduction signal flag2 input from the output current command value setting unit 602. If the output current reduction signal flag2 is ON, the flow advances to step S703. On the other hand, if the output current reduction signal flag2 is OFF, the flow advances to step S408.

Step S703 is a process when output current reduction control (to be described later) in the output current command value setting unit 602 is continuing after recovery from an instantaneous drop. In step S703, the intermediate voltage command value setting unit 601 continues the constant intermediate voltage control on the basis of the intermediate voltage command value Vc* set in step S701.

The intermediate voltage command value setting unit 601 performs control during a period from occurrence of an instantaneous drop to completion of the output current reduction control (to be described later) such that the intermediate voltage Vc is steady by setting the intermediate voltage command value Vc* for the intermediate voltage Vc in the above-described manner.

<Operation of Output Current Command Value Setting Unit 602>

FIG. 8 is a flowchart illustrating the operation of the output current command value setting unit 602.

Step S801 is a step of detecting a moment of recovery from an instantaneous drop by sensing a transition from ON to OFF of the instantaneous drop detection signal flag1. If a transition from ON to OFF of the instantaneous drop detection signal flag1 is detected, the flow advances to step S803; otherwise, the flow advances to step S802.

Step S802 is a step of detecting a moment of occurrence of an instantaneous drop by sensing a transition from OFF to ON of the instantaneous drop detection signal flag1. If a transition from OFF to ON of the instantaneous drop detection signal flag1 is detected, the flow advances to step S804; otherwise, the flow advances to step S805. (Note that the judgment in step S802 is NO in normal times).

Step S803 sets the output current reduction signal flag2 indicating that the output current reduction control is in execution to ON. (The output current reduction signal flag2 is ON during a period when the output current reduction control is executed and is OFF during a period when the output current reduction control is not executed.)

Step S804 is a step of recording, in the storage unit 604, the active current command value Ip* determined immediately before the transition from OFF to ON of the instantaneous drop detection signal flag1 is detected. With the judgment in step S802, the active current command value Ip* to be recorded in the storage unit 604 in step S804 is an active current command value in normal times immediately before occurrence of an instantaneous drop.

Step S805 is a step of performing conditional branch processing on the basis of the output current reduction signal flag2. If the output current reduction signal flag2 is ON, the flow advances to step S806. On the other hand, if the output current reduction signal flag2 is OFF, the flow advances to END to perform the same processing as the output current command value setting unit 205 according to the first embodiment.

Processes in steps S806 to S809 to be described below correspond to the output current reduction control.

Step S806 is a step of calculating an active current target value Ip2* which is obtained by multiplying the active current command value Ip* recorded in the storage unit 604 by a current reduction coefficient β on the basis of the amount ΔV of voltage drop input from the instantaneous drop detection unit 210, as shown in Expressions (8) and (9):

$$\beta = 1 - \Delta V \times K3 \tag{8}$$

$$Ip2^* = Ip^* \times \beta \tag{9}$$

In Expression (8), K3 (for example, 1/250) is a constant set in advance such that the current reduction coefficient β has a value proportional to (decreasing monotonously with) the amount ΔV of voltage drop. That is, the current reduction coefficient β is a coefficient indicating a percentage (%) for reducing the active current command value Ip* recorded in the storage unit 604. As the amount ΔV of voltage drop becomes larger, a reduction percentage (1−β) becomes larger, and the active current target value Ip2* becomes smaller. (The current reduction coefficient β and the active current target value Ip2* have negative correlations with the amount ΔV of voltage drop.)

Step S807 is a step of performing limit processing that limits the active current target value Ip2* calculated in step S806 to not less than 0 so as not to have a negative value.

Step S808 is a step of sweeping (restoring) an effective current command value from the active current target value Ip2* subjected to the limit processing in step S807 to the active current command value Ip* immediately before the occurrence of the instantaneous drop recorded in step S804 through moving average processing. The output current command value setting unit 602 outputs an active current command value Ip3* obtained through the moving average processing to the active current control unit 206 while the output current reduction signal flag2 is ON. Note that the moving average processing is a process of outputting an average value of a predetermined number N of (for example, 10) previous pieces of sample data among pieces of sample data obtained by sampling time-series data fluctuating in value with time in cycles of predetermined duration (for example, in cycles for AD conversion in the controller 600). In the present embodiment, an initial value of the time-series data is set to the active current target value Ip2* subjected to the limit processing in step S807, and when N pieces of sample data having the active current target value Ip2* subjected to the limit processing in step S807 are obtained, a value of the time-series data is changed to the active current command value Ip* immediately before the occurrence of the instantaneous drop recorded in step S804. With this process, output of the moving average processing changes (rises) gradually from the active current target value Ip2* subjected to the limit processing in step S807 to the active current command value Ip* immediately before the occurrence of the instantaneous drop recorded in step S804. Note that a time for return from the active current target value Ip2* to the active current command value Ip* immediately before the occurrence of the instantaneous drop may be fixed, regardless of the active current target value Ip2*.

Step S809 is a step of judging from the active current command value Ip3* obtained through the moving average processing and the active current command value Ip* immediately before the occurrence of the instantaneous drop recorded in step S804 whether the output current reduction control is completed. The output current command value setting unit 602 judges that the output current reduction control is completed when the active current command value Ip3* obtained through the moving average processing and the active current command value Ip* immediately before the occurrence of the instantaneous drop recorded in step S804 become equal to each other. If completion of the output current reduction control is detected, the flow advances to step S810 to turn off the output current reduction signal flag2. On the other hand, if completion of the output current reduction control is not detected, the flow advances to END. (In this case, the output current reduction signal flag2 remains ON, and the output current command value setting unit 602 continues the output current reduction control.)

The output current command value setting unit 602 reduces the output current Is when recovering from an instantaneous drop in accordance with the amount ΔV of voltage drop through the operation illustrated in FIG. 8. As a result, fluctuations in output from the inverter 103 when recovering from an instantaneous drop are moderated. This allows reduction in a drop in the intermediate voltage Vc when recovering from an instantaneous drop and reduction in generation of higher harmonics in the output current Is from the inverter 103 (a power conditioner 100) even when recovering from an instantaneous drop.

<Conclusion of Second Embodiment>

FIGS. 9A to 9D are charts illustrating an effective value of a system voltage Vs, an effective value of the output current Is from the inverter 103, an effective value of the output from the inverter 103, and the intermediate voltage Vc upon occurrence of an instantaneous drop and upon recovery from the instantaneous drop, according to the second embodiment. Note that a way of viewing FIGS. 9A to 9D is the same as a way of viewing FIGS. 5A to 5D.

Figure 9A:
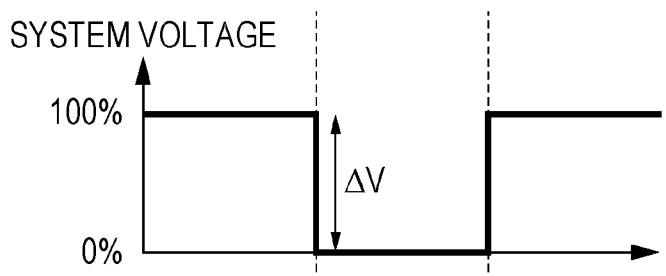
FIGS. 9A to 9D are charts illustrating an effective value of a system voltage, an effective value of an output current from an inverter, an effective value of output from the inverter, and an intermediate voltage upon occurrence of an instantaneous drop and upon recovery from the instantaneous drop, according to the second embodiment.
Figure 9B:
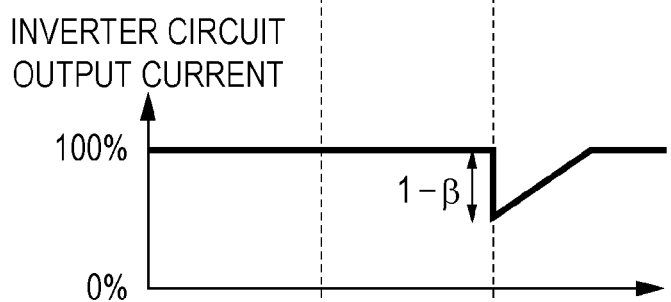
Figure 9C:
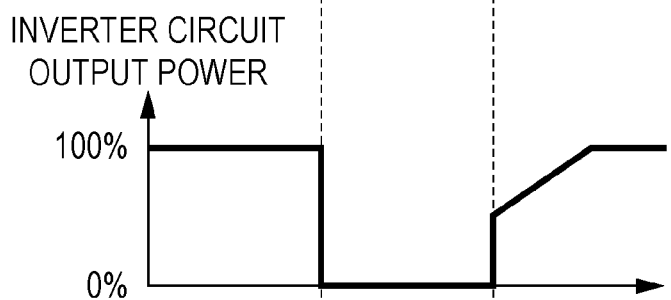
Figure 9D:
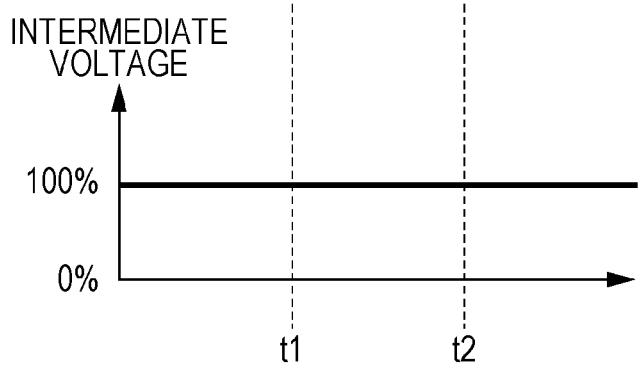

The controller 600 according to the second embodiment controls the output current Is from the inverter 103 such that the reduction percentage (1−β) increases with an increase in the amount ΔV of voltage drop when recovery from an instantaneous drop is detected, as illustrated in FIG. 9B. As a result, the power conditioner 100 according to the second embodiment moderates fluctuations in output when recovering from an instantaneous drop. This allows reduction in a drop in the intermediate voltage Vc when recovering from an instantaneous drop and reduction in generation of higher harmonics in an output current from the power conditioner 100 upon the recovery from the instantaneous drop. Note that although the example illustrated in FIGS. 8 and 9A to 9D illustrates a form which restores the output current from the inverter 103 when recovering from an instantaneous drop from the active current target value Ip2* to a value before occurrence of the instantaneous drop, the present disclosure is not limited to this. The output current from the inverter 103 when recovering from the instantaneous drop may be raised from the active current target value Ip2* and restored to a value smaller than the value before the occurrence of the instantaneous drop or a value larger than the value before the occurrence of the instantaneous drop.

That is, as long as the output current from the inverter 103 when recovering from an instantaneous drop is made smaller than a value before occurrence of the instantaneous drop by an amount increasing with an increase in the amount ΔV of voltage drop during the instantaneous drop and then raised, generation of higher harmonics can be reduced. The output current after the rise may have any value.

In the method involving increasing an intermediate voltage on the basis of the amount ΔV of voltage drop according to the first embodiment, there is an upper limit to an increase in an intermediate voltage corresponding to a withstand voltage of a capacitor accumulating the intermediate voltage. For this reason, if the amount ΔV of voltage drop is large, an intermediate voltage may be unable to be increased by a necessary amount depending on a selected capacitor or the like. In contrast, in the second embodiment, an active current command value can be changed within the range of 0% to 100% of a value before occurrence of an instantaneous drop when recovering from the instantaneous drop. Even if the amount ΔV of voltage drop is large, fluctuations in output when recovering from the instantaneous drop can be sufficiently moderated, and a drop in intermediate voltage can be reduced.

Third Embodiment

<Summary of Third Embodiment>

The first embodiment has described a method involving increasing an intermediate voltage on the basis of the amount of voltage drop. The second embodiment has described a method involving reducing an output current from an inverter on the basis of the amount of voltage drop.

A third embodiment will describe a configuration which performs both increasing an intermediate voltage on the basis of the amount of voltage drop and reducing an output current on the basis of the amount of voltage drop.

<Configuration of Controller 1000 According to Third Embodiment>

Figure 10:
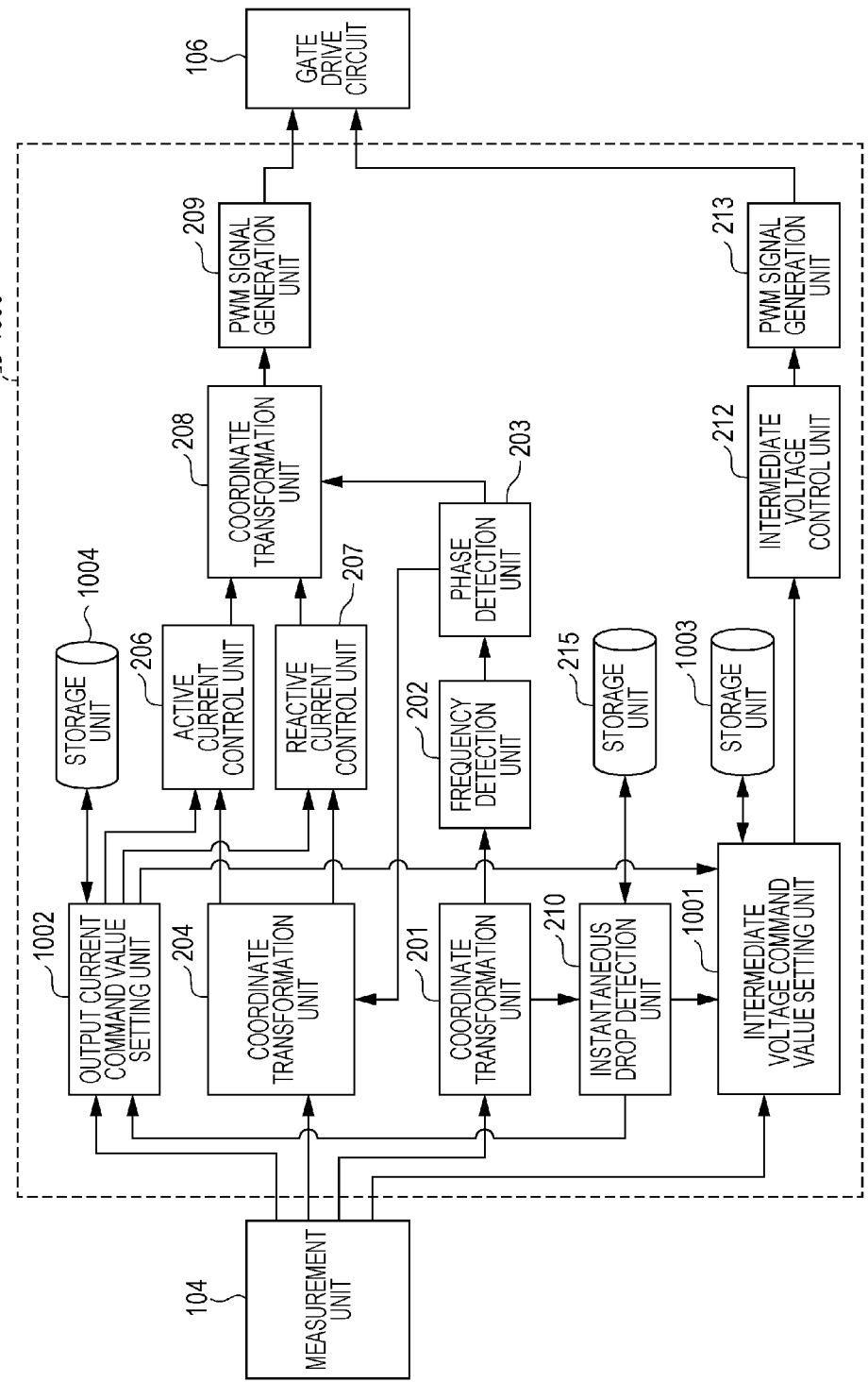
FIG. 10 is a block diagram illustrating an example of the configuration of a controller according to a third embodiment.

FIG. 10 is a diagram illustrating the configuration of a controller 1000 according to the third embodiment.

The controller 1000 according to the third embodiment includes an intermediate voltage command value setting unit 1001, an output current command value setting unit 1002, and storage units 1003 and 1004, instead of the intermediate voltage command value setting unit 211, the output current command value setting unit 205, and the storage units 216 and 214 in the controller 105 according to the first embodiment. The same components as those in the first and second embodiments are denoted by the same reference numerals, and a description thereof will be omitted.

The intermediate voltage command value setting unit 1001 acquires an instantaneous drop detection signal flag1 and an amount ΔV of voltage drop from an instantaneous drop detection unit 210 and changes a target value for intermediate voltage control. The details of the operation of the intermediate voltage command value setting unit 1001 will be described later.

The output current command value setting unit 1002 is the same as the output current command value setting unit 205 according to the second embodiment in that an active current command value Ip* is set on the basis of the amount ΔV of voltage drop when recovering from an instantaneous drop and then swept to a value before occurrence of the instantaneous drop. The output current command value setting unit 1002, however, is different in that whether to enable output current reduction control is judged on the basis of the amount ΔV of voltage drop. The details of the operation of the output current command value setting unit 1002 will be described later.

<Operation of Intermediate Voltage Command Value Setting Unit 1001>

Figure 11:
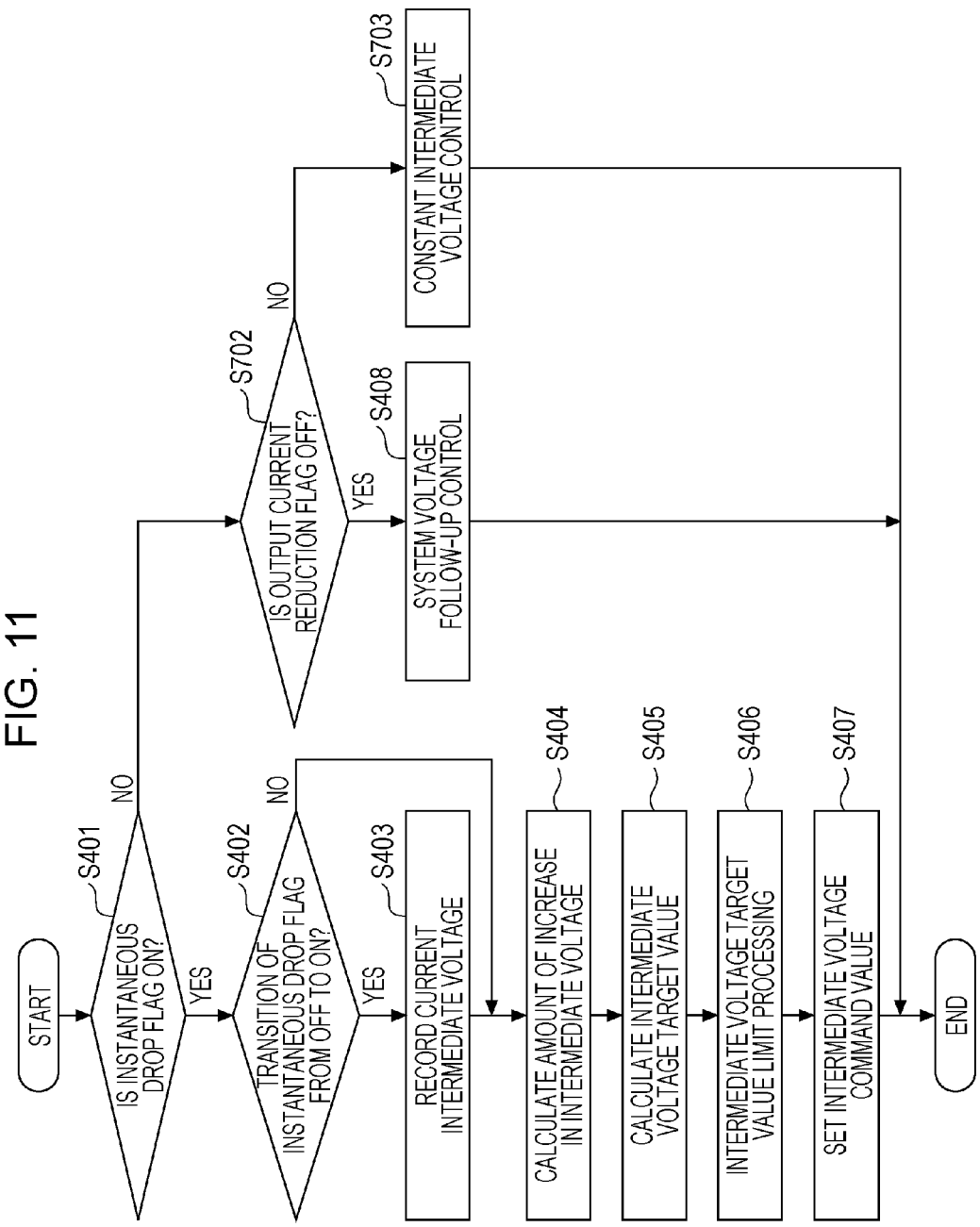
FIG. 11 is a flowchart of the operation of an intermediate voltage command value setting unit according to the third embodiment.

FIG. 11 is a flowchart illustrating the operation of the intermediate voltage command value setting unit 1001.

Processes in steps S401 to S408 are the same as those in the first embodiment.

Processes in steps S702 and S703 are the same as those in the second embodiment.

<Operation of Output Current Command Value Setting Unit 1002>

Figure 12:
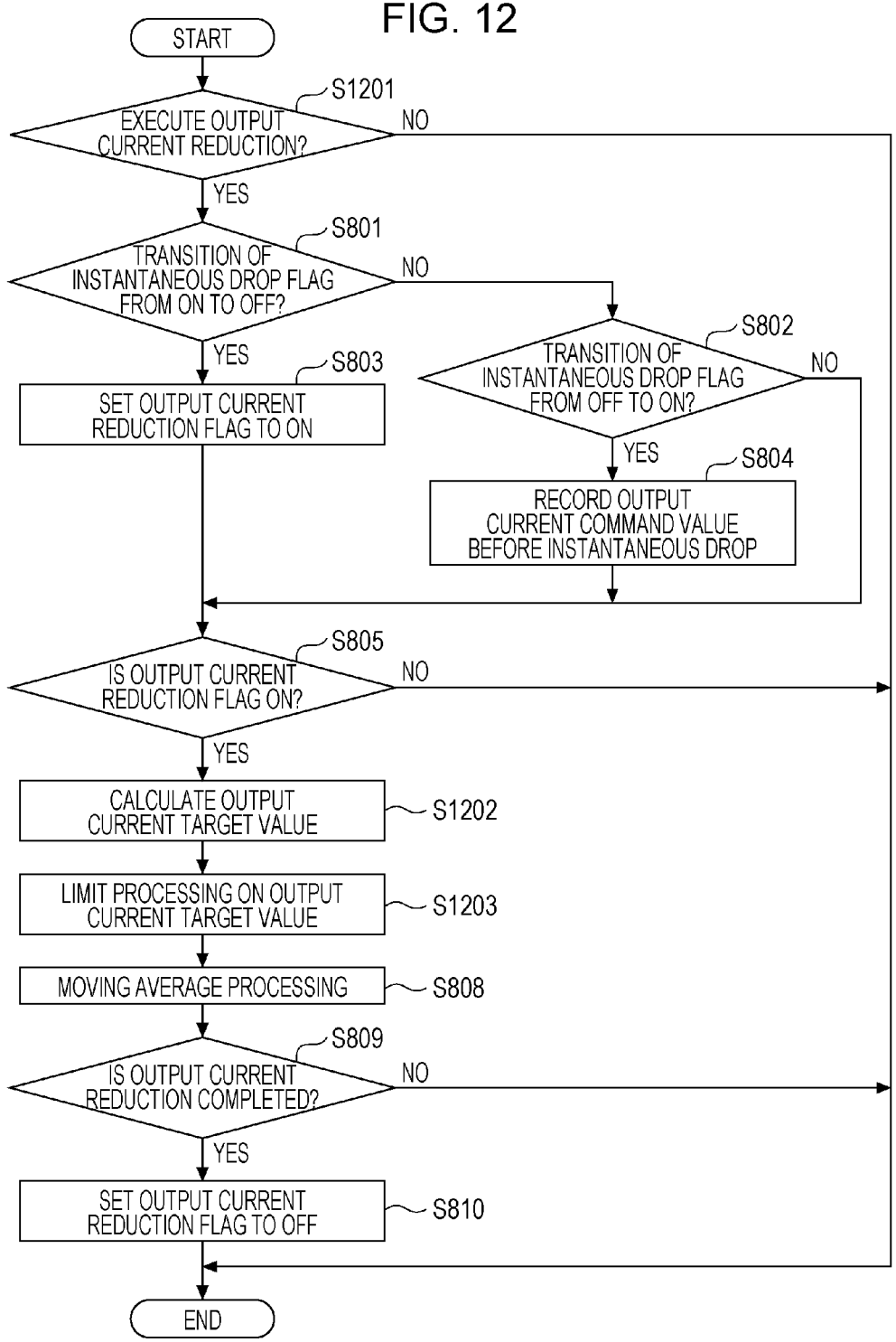
FIG. 12 is a flowchart of the operation of an output current command value setting unit according to the third embodiment.

FIG. 12 is a flowchart illustrating the operation of the output current command value setting unit 1002. The same operations as those in the second embodiment are denoted by the same step numbers, and a description thereof will be omitted.

The second embodiment has a configuration in which output reduction control is enabled only on the basis of the instantaneous drop detection signal flag1. The present embodiment is different from the second embodiment in that whether to execute an output reduction function is judged on the basis of the amount of voltage drop (step S1201) and that an output current reduction percentage is calculated in consideration of the amount of increase in intermediate voltage (steps S1202 and S1203).

Step S1201 is a step of judging whether the amount ΔV of voltage drop is larger than a threshold A set in advance. If the amount ΔV of voltage drop is larger than the threshold A, the flow advances to step S801. On the other hand, if the amount ΔV of voltage drop is not more than the threshold A, the process advances to END (if the amount ΔV of voltage drop is not more than the threshold A, the output current reduction control is not enabled). As the threshold A, for example, a limit value for the amount of voltage drop which allows reduction in a harmonic current generated by an inverter 103 when recovering from an instantaneous drop by an increase in intermediate voltage is set.

Step S1202 is a step of calculating an active current target value Ip2* using Expression (8) in the second embodiment and Expression (10) below:

$$Ip2^* = Ip^* \times \beta + B \quad (10)$$

In Expression (10), B corresponds to the amount of fluctuation in output moderated by an increase in intermediate voltage and is a constant larger than 0 which gives a lower limit for a reduced current command value (Ip2*). Since an increase in the intermediate voltage removes the need to moderate all of fluctuations in output by a reduction in an output current when recovering from an instantaneous drop, a lower limit for output reduction can be made larger than 0.

Step S1203 is a step of performing limit processing that limits the active current target value Ip2* calculated in step S1202 so as not to be less than the constant B.

The output current command value setting unit 1002 reduces the output current when recovering from an instantaneous drop in accordance with the amount ΔV of voltage drop during the instantaneous drop, through the operation illustrated in FIG. 12. As a result, like the second embodiment, generation of higher harmonics in the output current from the inverter 103 (a power conditioner 100) can be reduced even when recovering from an instantaneous drop. Additionally, an increase in intermediate voltage moderates fluctuations in output, which allows reduction in an amount by which the output current is to be reduced. For this reason, even if the amount ΔV of voltage drop is large, the output current need not be reduced to 0 when recovering from an instantaneous drop, and a time needed for restoration to original output can be shortened.

<Conclusion of Third Embodiment>

FIGS. 13A to 13D are charts illustrating an effective value of a system voltage Vs, an effective value of an output current Is from the inverter 103, an effective value of output from the inverter 103, and an intermediate voltage Vc upon occurrence of an instantaneous drop and upon recovery from the instantaneous drop, according to the third embodiment. Note that a way of viewing FIGS. 13A to 13D is the same as the ways of viewing FIGS. 5A to 5D and FIGS. 9A to 9D.

Figure 13A:
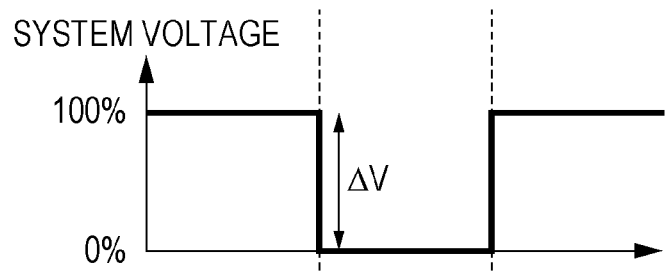
FIGS. 13A to 13D are charts illustrating an effective value of a system voltage, an effective value of an output current from an inverter, an effective value of output from the inverter, and an intermediate voltage upon occurrence of an instantaneous drop and upon recovery from the instantaneous drop, according to the third embodiment.
Figure 13B:
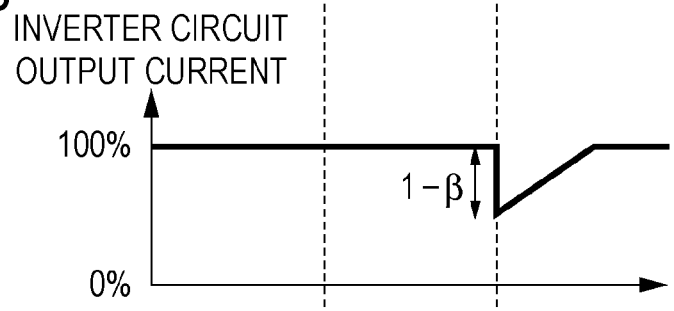
Figure 13C:
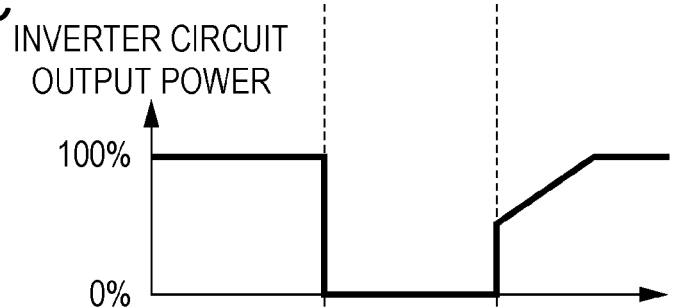
Figure 13D:
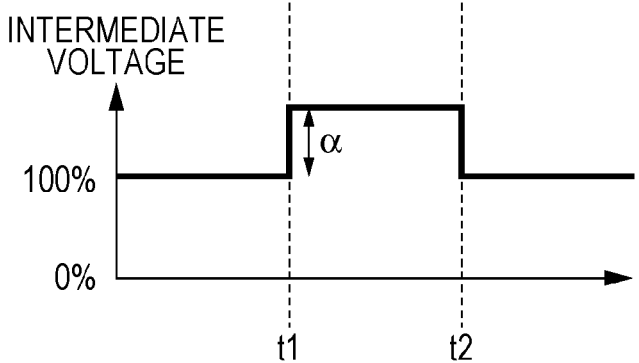

The controller 1000 according to the third embodiment moderates fluctuations in output from the inverter 103 at a time t2 of recovery from an instantaneous drop by an increase in intermediate voltage during the instantaneous drop and a reduction in an output current when recovering from the instantaneous drop, as illustrated in FIGS. 13B and 13D. This allows reduction in a drop in intermediate voltage when recovering from an instantaneous drop and reduction of generation of higher harmonics in the output current even when recovering from the instantaneous drop to reduce deterioration in power quality. Even if the amount ΔV of voltage drop is large, the output current need not be reduced to 0 at the time t2 of recovery, and outputting current can be continued for a given time. A time needed to restore the output current to original output current can be made shorter than the method involving only reducing the output current illustrated in the second embodiment. Note that although the example illustrated in FIGS. 12 and 13A to 13D illustrates a form which restores the output current from the inverter 103 when recovering from an instantaneous drop from the active current target value Ip2* to a value before occurrence of the instantaneous drop, the present disclosure is not limited to this. The output current from the inverter 103 when recovering from the instantaneous drop may be raised from the active current target value Ip2* and restored to a value smaller than the value before the occurrence of the instantaneous drop or a value larger than the value before the occurrence of the instantaneous drop.

That is, as long as the output current from the inverter 103 when recovering from an instantaneous drop is made smaller than a value before occurrence of an instantaneous drop by an amount increasing with an increase in the amount $\Delta V$ of voltage drop during the instantaneous drop and then raised, generation of higher harmonics can be reduced. The output current after the rise may have any value.

(Supplementary Note 1)

Embodiments of a controller disclosed in the present specification have been described above. The controllers according to the present disclosure may be modified in the manners below.

<1> In the above-described embodiments, a case has been described where the power factor of the inverter 103 is 1. The present disclosure, however, is not limited to this case. The power factor of the inverter 103 may be, for example, 95% as long as the power factor follows the Grid-interconnection Code or the like. The reactive current command value Iq* is not limited to 0.

<2> In the above-described embodiments, the active current command value Ip* and the intermediate voltage command value Vc* are set in normal times such that the intermediate voltage Vc follows up an effective value of the system voltage Vs. The present disclosure, however, is not limited to this case. For example, the active current command value Ip* and the intermediate voltage command value Vc* may be set in normal times such that the intermediate voltage Vc is steady regardless of the system voltage Vs.

<3> In the second and third embodiments, an output current command value is swept through moving average processing. The present disclosure, however, is not limited to this. The output current command value may be swept by periodically adding a current incremental value defined in advance.

<4> In the embodiments, a case has been described where the controller 105, 600, or 1000 performs AD conversion at a predetermined frequency of 17.5 kH, and functional units perform processing on an obtained digital signal. The present disclosure, however, is not limited to this case. The frequency for AD conversion may be any one as long as the functional units can perform processing synchronously with one another and may be, for example, 20 kHz.

<5> In the first and third embodiments, the amount $\alpha$ of increase in intermediate voltage is calculated using Expression (5). The present disclosure, however, is not limited to this. The amount $\alpha$ of increase in intermediate voltage only needs to have a positive correlation with the amount $\Delta V$ of voltage drop and may not be linear with respect to the amount $\Delta V$ of voltage drop. For example, values for the amount of voltage drop may be divided into a plurality of groups, and a table holding the amount $\alpha$ of increase in intermediate voltage for each group may be stored in advance. Upon occurrence of an instantaneous drop, the amount $\alpha$ of increase in intermediate voltage may be obtained by referring to the table.

The amount $\alpha$ of increase in intermediate voltage may not be calculated if an intermediate voltage command value during an instantaneous drop has a positive correlation with the amount $\Delta V$ of voltage drop. For example, the intermediate voltage command value during the instantaneous drop may be calculated by multiplying the intermediate voltage command value before the instantaneous drop by an increase factor having a positive correlation with the amount $\Delta V$ of voltage drop.

<6> In the second and third embodiments, an active current command value when recovering from an instantaneous drop is obtained by multiplying the active current command value before the instantaneous drop by the current reduction coefficient $\beta$. The present disclosure, however, is not limited to this. The active current command value upon the recovery from the instantaneous drop only needs to have a negative correlation with the amount $\Delta V$ of voltage drop. The active current command value upon the recovery from the instantaneous drop may be calculated by, for example, subtracting a value having a positive correlation with the amount $\Delta V$ of voltage drop from the active current command value before the instantaneous drop.

<7> The controllers 105, 600, and 1000 described in the embodiments are typically implemented as digital signal processors (DSPs) as integrated circuits. Functional units may be individually made into chips or some or all of the functional units may be made into one chip.

A technique of implementing an integrated circuit is not limited to a DSP, and an integrated circuit may be implemented using a dedicated circuit or a general-purpose processor. A field programmable gate array (FPGA) which can be programmed after fabrication or a reconfigurable processor in which cell connection and setting inside an integrated circuit can be reconfigured may be used.

(Supplementary Note 2)

Configurations of power conditioners and controllers for a power conditioner, and control methods for a power conditioner according to embodiments will be described below.

<1> According to a first aspect of the present disclosure, there is provided a controller for a power converter including a DC/DC converter which transforms DC power input from a dispersion type power source into DC power, a capacitor which holds the DC power supplied from the DC/DC converter, and an inverter which converts the DC power held by the capacitor to AC power and outputs the AC power to a power system. The controller for the power converter includes a sensor which controls the inverter to detect the amount of voltage drop during an instantaneous voltage drop in a power system, when the power system recovers from an instantaneous voltage drop and a current control unit which lowers an AC current output from the inverter to be smaller than a value before occurrence of the instantaneous voltage drop by an amount increasing with an increase in the amount of voltage drop sensed by the sensor, and raises the AC current from the inverter after the lowering.

According to a second aspect of the present disclosure, there is provided a power conversion apparatus including a DC/DC converter which transforms DC power input from a dispersion type power source into DC power, a capacitor which holds the DC power supplied from the DC/DC converter, an inverter which converts the DC power held by the capacitor to AC power and outputs the AC power to a power system, and a controller which controls, when the power system recovers from an instantaneous voltage drop, the inverter to lower an AC current output from the inverter to be smaller than a value before occurrence of the instantaneous voltage drop by an amount increasing with an increase in the amount of voltage drop during the instantaneous voltage drop and raises the AC current from the inverter after the lowering.

According to a third aspect of the present disclosure, there is provided a control method for a power conversion apparatus, including the steps of transforming DC power input from a dispersion type power source into DC power by a DC/DC converter, holding the DC power supplied from the DC/DC converter in a capacitor, converting the DC power held by the capacitor to AC power by an inverter and outputting the AC power to a power system, controlling, when the power system recovers from an instantaneous voltage drop, the inverter to lower an AC current output from the inverter to be smaller than a value before occurrence of the instantaneous voltage drop by an amount increasing with an increase in the amount of voltage drop during the instantaneous voltage drop and to raise the AC current from the inverter after the lowering.

With these configurations, fluctuations in output from an inverter are moderated when recovering from an instantaneous drop. This allows reduction in a drop in intermediate voltage upon the recovery from the instantaneous drop and reduction in generation of higher harmonics in an AC current output from the inverter. That is, the first problem is alleviated.

<2> According to a fourth aspect of the present disclosure, there is provided a controller for a power converter according to the first aspect which may further include a voltage setting unit which controls the DC/DC converter during the instantaneous voltage drop to increase a voltage of the capacitor with an increase in the amount of voltage drop during the instantaneous voltage drop.

According to a fifth aspect of the present disclosure, there is provided a power conversion apparatus according to the second aspect, in which the controller controls the DC/DC converter during the instantaneous voltage drop to increase a voltage of the capacitor with an increase in the amount of voltage drop during the instantaneous voltage drop.

According to a sixth aspect of the present disclosure, there is provided a control method for a power conversion apparatus according to the third aspect, further including the step of controlling the DC/DC converter during the instantaneous voltage drop to increase a voltage of the capacitor increases with an increase in the amount of voltage drop during the instantaneous voltage drop.

With these configurations, fluctuations in output from an inverter when recovering from an instantaneous drop are moderated through an increase in intermediate voltage during a period of the instantaneous drop and a reduction in AC current upon the recovery from the instantaneous drop. This allows reduction in a drop in intermediate voltage upon the recovery from the instantaneous drop and reduction in generation of higher harmonics in an AC current even upon the recovery from the instantaneous drop to reduce deterioration in power quality. Even if the amount of voltage drop during the instantaneous drop is large, the AC current need not be reduced to zero upon the recovery, and current outputting can be continued. A time needed for restoration to an AC current before the instantaneous drop can be shortened. Even if the amount of voltage drop during the instantaneous drop is small with respect to a target value for a voltage of an internal capacitor, the voltage of the internal capacitor is not higher than necessary, and a drop in power conversion efficiency during the period of the instantaneous drop is reduced. That is, the second problem is alleviated.

<3> According to a seventh aspect of the present disclosure, there is provided a controller for a power converter according to the first aspect, in which the current control unit brings the AC current from the inverter close to a current target value which is obtained by multiplying a value before occurrence of the instantaneous voltage drop of a current command value by a current reduction coefficient decreasing with an increase in the amount of voltage drop.

According to an eighth aspect of the present disclosure, there is provided a power conversion apparatus according to the second aspect, in which the controller brings an AC current output from the inverter close to a current target value which is obtained by multiplying a value before occurrence of the instantaneous voltage drop of a current command value by a current reduction coefficient decreasing with an increase with the amount of voltage drop.

<4> According to a ninth aspect of the present disclosure, there is provided a controller for a power converter according to the fourth aspect, in which the voltage setting unit controls the DC/DC converter to bring the voltage of the capacitor close to a voltage target value which is obtained by adding a voltage incremental value increasing with an increase in the amount of voltage drop to a value before occurrence of the instantaneous voltage drop of the voltage of the capacitor.

According to a tenth aspect of the present disclosure, there is provided a power conversion apparatus according to the fifth aspect, in which the controller controls the DC/DC converter to bring the voltage of the capacitor close to a voltage target value which is obtained by adding a voltage incremental value increasing with an increase in the amount of voltage drop to a value before occurrence of the instantaneous voltage drop of the capacitor.

<5> According to an 11th aspect of the present disclosure, there is provided a controller for a power converter, including a DC/DC converter which transforms DC power input from a dispersion type power source into DC power, a capacitor which holds the DC power supplied from the DC/DC converter, an inverter which converts the DC power held by the capacitor to AC power and outputs the AC power to a power system, and a voltage setting unit which controls the DC/DC converter during the instantaneous voltage drop to increase a voltage of the capacitor with an increase in the amount of voltage drop during the instantaneous voltage drop.

According to a 12th aspect of the present disclosure, there is provided a power conversion apparatus including a DC/DC converter which transforms DC power input from a dispersion type power source into DC power, a capacitor which holds the DC power supplied from the DC/DC converter, an inverter which converts the DC power held by the capacitor to AC power and outputs the AC power to a power system, and a controller which controls the DC/DC converter during an instantaneous voltage drop to increase a voltage of the capacitor with an increase in the amount of voltage drop during the instantaneous voltage drop.

According to a 13th aspect of the present disclosure, there is provided a control method for a power conversion apparatus, including the steps of transforming DC power input from a dispersion type power source into DC power by a DC/DC converter, holding the DC power supplied from the DC/DC converter in a capacitor, converting the DC power held by the capacitor to AC power by an inverter and outputting the AC power to a power system, and controlling the DC/DC converter during an instantaneous voltage drop to increase a voltage of the capacitor with an increase in the amount of voltage drop during the instantaneous voltage drop.

With these configurations, an intermediate voltage is made higher on the basis of the amount of voltage drop during a period of an instantaneous drop in expectation of a drop in the intermediate voltage when recovering from the instantaneous drop, thereby allowing a capacitor to maintain the intermediate voltage needed to maintain an output current sinusoidal. Thus, a power converter reduces generation of higher harmonics in an output current even when recovering from an instantaneous drop and reduces deterioration in the power quality of output.

Even if the amount of voltage drop during an instantaneous drop is small with respect to a target value set in advance for a voltage of an internal capacitor, the voltage of the internal capacitor is not higher than necessary, and a drop in power conversion efficiency during a period of the instantaneous drop is reduced. That is, the second problem is alleviated.

A power conversion apparatus disclosed in the present specification is useful in, for example, a dispersion type power source system interconnected to a power system.

What is claimed is:

1. A power conversion apparatus comprising:
   a DC/DC converter which transforms DC power input from a dispersion type power source into DC power;
   a capacitor which holds the DC power supplied from the DC/DC converter;
   an inverter which converts the DC power held by the capacitor to AC power and outputs the AC power to a power system; and
   a controller which controls, immediately after the power system recovers to a voltage before occurrence of an instantaneous voltage drop from the instantaneous voltage drop, the inverter to output an AC current of which output is larger than zero and smaller than a value before occurrence of the instantaneous voltage drop,
   wherein the controller controls the DC/DC converter during the instantaneous voltage drop to increase a voltage of the capacitor by an amount proportional to the drop in voltage during the instantaneous voltage drop.

2. The power conversion apparatus according to claim 1, wherein the controller further controls the inverter to restore the AC current output to the value before occurrence of the instantaneous voltage drop.

3. A control method for a power conversion apparatus, comprising:
   transforming DC power input from a dispersion type power source by a DC/DC converter into DC power;
   holding the DC power supplied from the DC/DC converter in a capacitor;
   converting the DC power held by the capacitor to AC power by an inverter and outputting the AC power to a power system;
   controlling, immediately after the power system recovers to a voltage before occurrence of an instantaneous voltage drop from the instantaneous voltage drop, the inverter to output an AC current of which output is larger than zero and smaller than a value before occurrence of the instantaneous voltage drop; and
   controlling the DC/DC converter during the instantaneous voltage drop to increase a voltage of the capacitor by an amount proportional to the drop in voltage during the instantaneous voltage drop.

4. The control method for the power conversion apparatus according to claim 3, further comprising:
   controlling the inverter to restore the AC current output to the value before occurrence of the instantaneous voltage drop.

* * * * *